(12) United States Patent
Malhotra et al.

(10) Patent No.: US 6,461,417 B1
(45) Date of Patent: *Oct. 8, 2002

(54) INK COMPOSITIONS

(75) Inventors: Shadi L. Malhotra, Mississauga (CA); Raymond W. Wong, Mississauga (CA); Marcel P. Breton, Mississauga (CA)

(73) Assignee: Xerox Corporation, Stamford, CT (US)

(*) Notice: Subject to any disclaimer, the term of this patent is extended or adjusted under 35 U.S.C. 154(b) by 35 days.

This patent is subject to a terminal disclaimer.

(21) Appl. No.: 09/645,712

(22) Filed: Aug. 24, 2000

(51) Int. Cl.$^7$ ................................................ C09D 11/02
(52) U.S. Cl. ................. 106/31.58; 106/31.29; 106/31.61; 106/31.86; 106/31.87
(58) Field of Search .............. 106/31.58, 31.86, 106/31.29, 31.61, 31.87

(56) References Cited

U.S. PATENT DOCUMENTS

| | | | |
|---|---|---|---|
| 4,308,547 A | 12/1981 | Lovelady et al. | 346/140 R |
| 4,751,528 A | 6/1988 | Spehrley, Jr. et al. | 346/140 R |
| 4,791,439 A | 12/1988 | Guiles | 346/140 R |
| 4,840,674 A | 6/1989 | Schwarz | 106/22 |
| 4,853,036 A | 8/1989 | Koike | 106/20 |
| 5,006,170 A | 4/1991 | Schwarz et al. | 106/20 |
| 5,041,161 A | 8/1991 | Cooke et al. | 106/22 |
| 5,041,849 A | 8/1991 | Quate et al. | 346/140 R |
| 5,121,141 A | 6/1992 | Hadimoglu et al. | 346/140 R |
| 5,122,187 A | 6/1992 | Schwarz et al. | 106/25 |
| 5,124,718 A | 6/1992 | Koike et al. | 346/1.1 |
| 5,427,611 A * | 6/1995 | Shirota et al. | 106/31.29 |
| 5,538,550 A * | 7/1996 | Yaegashi et al. | 106/31.29 |
| 5,558,699 A * | 9/1996 | Nakashima et al. | 106/31.16 |
| 5,607,501 A * | 3/1997 | Fujioka | 106/31.29 |
| 5,667,568 A | 9/1997 | Sacripante et al. | 106/20 R |
| 5,698,017 A | 12/1997 | Sacripante et al. | 106/31.49 |
| 5,698,128 A | 12/1997 | Sakai et al. | 219/745 |
| 5,700,316 A | 12/1997 | Pontes et al. | 106/31.58 |
| 5,876,492 A | 3/1999 | Malhotra et al. | 106/31.58 |
| 5,902,390 A | 5/1999 | Malhotra et al. | 106/31.58 |
| 5,922,117 A | 7/1999 | Malhotra et al. | 106/31.58 |
| 5,931,995 A | 8/1999 | Malhotra et al. | 106/31.58 |
| 5,958,119 A | 9/1999 | Malhotra et al. | 106/31.43 |
| 6,017,386 A * | 1/2000 | Sano et al. | 106/31.32 |
| 6,117,223 A * | 9/2000 | Malhotra | 106/31.29 |

* cited by examiner

*Primary Examiner*—Helene Klemanski
*Assistant Examiner*—Veronica F. Faison
(74) *Attorney, Agent, or Firm*—E. O. Palazzo

(57) ABSTRACT

An ink composition comprised of (1) an ink vehicle of (a) alkyl alkyl ketones of the formula $CH_3(CH_2)_m$ CO $(CH_2)_n$ $CH_3$ where m and n represent the number of segments and wherein alkyl contains from about 1 to about 25 carbons, (b) alkyl aryl ketones where each alkyl contains from about 1 to about 20 carbons, and the aryl is anthracene, naphthalene or phenyl, (c) arylaryl ketones where each aryl is benzyl, phenyl or naphthyl, (2) an ink viscosity component, (3) a conductive compound, (4) an antioxidant compound, (5) a lightfastness component, and (6) a colorant.

29 Claims, No Drawings

INK COMPOSITIONS

COPENDING PATENT APPLICATIONS AND PATENT

Inks are illustrated in copending patent applications U.S. Ser. No. 935,929, U.S. Ser. No. 935,889, U.S. Ser. No. 935,639, U.S. Ser. No. 933,914, U.S. Ser. No. 09/300,210, U.S. Ser. No. 09/300,193, U.S. Ser. No. 09/300,373, U.S. Ser. No. 09/300,298, U.S. Ser. No. 09/300,331, U.S. Ser. No. 09/300,333, U.S. Ser. No. 09/300,332, U.S. Ser. No. 09/342,392, and U.S. Pat. No. 5,876,492, the disclosures of each being totally incorporated herein by reference.

The appropriate components of the above copending applications and patent may be selected for the inks and processes of the present invention in embodiments thereof.

BACKGROUND OF THE INVENTION

The present invention is directed to phase change conductive inks that possess the quality of transmitting electrical signals generated by electric field assisted acoustic inkjet printing processes and apparatuses with controlled jeftability leading to low edge raggedness such as for example, less than about three microns. The phase change ink is preferably an ink that changes from a liquid state to solid state in a suitable period of time, for example from about 1 to about 100 milliseconds and preferably in less than about 10, such as from about 2 to about 7 milliseconds. The conductivity of a material such as an ink is measured in terms of reciprocal of resistivity, which refers to the capacity for electrical resistance. The conductivity values of inks expressed as log (pico.mho/cm) and recited herein were measured under melt conditions at 150° C. by placing an aluminum electrode in the molten ink and reading the resistivity output on a Gen Rad 1689 precision RLC Digibridge at a frequency of 1 K.Hz.

More specifically, the present invention relates to inks with a melting point of about 60° C. and about 150° C., and preferably about 70 to about 90° C., especially useful for electric field assisted acoustic inkjet printing with enhanced jettability, acoustic ink processes and apparatuses, reference, for example, U.S. Pat. No. 5,121,141, U.S. Pat. No. 5,111,220, U.S. Pat. No. 5,128,726, U.S. Pat. No. 5,371,531, the disclosures of which are totally incorporated herein by reference, including especially acoustic ink processes as illustrated in some of the aforementioned copending applications and patents, such as an acoustic ink printer for printing images on a record medium. The inks of the present invention in embodiments thereof are comprised of (1) an ink vehicle with for example, a melting point of about 75° C. and about 150° C., and more specifically about 90 to about 130° C. and which vehicle is selected from the group consisting of an alkyl alkyl, alkyl aryl, or aryl aryl ketones, (2) a viscosity modifying compound that can reduce the viscosity of ink from about 20 to 6 centipoise and which compound is selected from mono and diketones, (3) a phase-change conductive sulfonate compound and that for example, can fill the pores of the paper, and which compound has a melting point of lower than about 135° C. and preferably about 70 to about 100° C., and with a low acoustic loss value of below about 100 dB/mm, (4) an antioxidant compound (5) a UV absorbing compound and (6) a colorant such as a dye, a pigment or mixtures thereof and wherein there can be generated with such inks in embodiments excellent developed images on plain and coated papers with acceptable image permanence, excellent projection efficiency on transparencies without a post fusing step, and excellent crease resistance, and wherein the inks possess acceptable, and in embodiments superior lighffastness values of about 90 to 100 percent and superior waterfastness values of about 95 to 100 percent. Moreover, in embodiments of the present invention there is enabled the elimination, or minimization of undesirable paper curl since water need not be present, and it is preferred in embodiments that there be an absence of water. When water is not present in the inks a dryer can be avoided thereby minimizing the cost of the acoustic ink jet apparatus and process.

PRIOR ART

In acoustic ink printing, the printhead produces approximately 2.2 picoliter droplets by an acoustic energy process. The ink under these conditions should display a melt viscosity of about 5 to 10 centipoise or less at the jetting temperature. Furthermore, once the ink is jetted onto the paper, the ink image should possess excellent crease properties, should be non-smearing, waterfast, of excellent transparency and excellent fix qualities. In selecting an ink for such applications, it is desirable that the vehicle display a low melt viscosity, such as from about 1 centipoise to about 25 centipoise in the acoustic head, while also displaying solid like properties after being jetted onto paper. Since the acoustic head can tolerate a temperature up to about 180° C., and preferably up to a temperature of from about 140° C. to about 160° C., the vehicle for the ink should preferably display liquid like properties such as a viscosity of 1 to about 10 centipoise at a temperature of from about 75° C. to about 165° C., and solidify or harden after jetting onto paper such that the ink displays a hardness value of from about 0.1 to about 0.5 millimeter utilizing a penetrometer according to the ASTM penetration method D1321.

Ink jet-printing processes that employ inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is selected to have a melting point above room temperature so that the ink, which is melted in the apparatus, will not be subject to evaporation or spillage during periods of nonprinting. In thermal ink jet printing processes employing phase-change inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Phase-change ink jets are somewhat similar to thermal ink jets; however, a phase-change ink contains no solvent. Thus, rather than being liquid at room temperature, a phase-change ink is typically a solid or phase-change with for example, a wax-like consistency. These inks usually need to be heated, for example, to approximately 100° C. before the ink melts and turns into a liquid. With phase-change inks, a plurality of ink jet nozzles is provided in a printhead. A piezoelectric vibrating element is located in each ink channel upstream from a nozzle so that the piezoelectric oscillations propel ink through the nozzle. After the phase-change ink is applied to the substrate, freezing on the substrate resolidifies the ink.

Each of these types of known ink jets, however, has a number of advantages and disadvantages. One advantage of thermal ink jets is their compact design for the integrated electronics section of the printhead. Thermal ink jets are disadvantageous in that the thermal ink has a tendency to soak into a plain paper medium. This blurs the print or thins out the print locally thereby adversely affecting print quality. Problems have been encountered with thermal ink jets in attempting to rid the ink of moisture fast enough so that the ink does not soak into a plain paper medium. This is particularly true when printing with color. Therefore, usually when printing with thermal ink, one needed to use coated papers, which are more expensive than plain paper.

One advantage of phase-change ink is its ability to print on plain paper since the phase-change ink quickly solidifies as it cools and, since it is waxy in nature, does not normally soak into a paper medium. However, phase-change inkjet system can be cumbersome in structure and in design, that is, the associated integrated electronics of a thermal ink jet head are considerably more compact than those of a phase-change ink jet head.

In addition, U.S. Pat. No. 4,751,528, the disclosure of which is totally incorporated herein by reference, discloses a phase-change ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify phase-change ink in a selected zone more rapidly to avoid offset by a pinch roll coming in contact with the surface of the substrate to which phase-change ink has been applied. Further, U.S. Pat. No. 4,791,439, the disclosure of which is totally incorporated by reference, discloses an apparatus for use with phase-change inks with an integrally connected ink jet head and reservoir system, the reservoir system including a highly efficient heat conducting plate inserted within an essentially nonheat conducting reservoir housing.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, disclose ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like. The inks of the present invention are dissimilar than the aforementioned '179 and '187, in that, for example, the invention vehicle selected displays acoustic loss values at a viscosity of from about 1 to about 20, and preferably 10 centipoise when heated to a temperature of from about 125° C. to about 165° C., such that acoustic energy in the printhead can eject an ink droplet onto paper.

U.S. Pat. No. 5,041,161, the disclosure of which is totally incorporated herein by reference, discloses a phase-change at room temperature ink. The inks can comprise vehicles, such as acids, aldehydes and mixtures thereof, which are phase-change at temperatures about 20° C. and 45° C. The ink is impulse jetted at an elevated temperature in the range of about 45° C. to about 110° C., at which temperature the ink has a viscosity of about 10 to 15 centipoise.

U.S. Pat. No. 4,853,036 and U.S. Pat. No. 5,124,718 disclose an ink for ink jet recording which comprises a liquid composition of a coloring matter, a volatile solvent with a vapor pressure of 1 millimeter Hg or more at 25° C., and a compound being solid at room temperature and with for example, a molecular weight of 300 or more.

U.S. Pat. No. 5,667,568 discloses an ink composition comprised of a colorant and a bisamide with for example, a viscosity of from about 1 centipoise to about 20 centipoise at a temperature of from about 125° C. to about 185° C.

U.S. Pat. No. 5,698,017 discloses an ink composition comprised of a colorant and a vehicle component, and which vehicle component is comprised of the condensation product of an organic acid and an amino alcohol.

U.S. Pat. No. 5,698,128 discloses an ink composition comprised of a colorant and a reversible crosslinked component vehicle obtained from the reaction product of an anhydride and an organoamine, and which ink possesses a viscosity of from about 1 centipoise to about 25 centipoise at a temperature of from about 125° C. to about 185° C.

U.S. Pat. No. 5,700,316 discloses an ink composition comprised of a colorant and a vehicle of a poly (alkylene oxide)-alkylate, a poly (alkylene oxide)-dialkylate, a polyoxa-alkanoate ester, or a polyoxa-alkanedioate diester, and which ink possesses a viscosity of from about 1 centipoise to about 15 centipoise at a temperature of from about 125° C. to about 165° C.

U.S. Pat. No. 5,876,492 discloses an ink composition comprised of ester compounds prepared for example, by mixing 35 percent by weight of a liquid ester γ-tbutyrolactone, 35 percent by weight of the solid additive methyl tetracosanoate, 20 percent by weight of the liquid crystalline ester material 4[(R)-(−) 2-chloro-3-methyl butyryl oxy] phenyl-4-(decyloxy) benzoate, 2 percent by weight of a UV absorber hexadecyl 3,5-di-tert-butyl-4-hydroxy-benzoate, 2 percent by weight of an antioxidant 3-hydroxy-2,2-dimethyl propyl-3-hydroxy2,2-dimethyl propionate and 6 percent by weight of the colorant selected from Orasol Black RLP, Sudan Blue 670, Sudan Red 462, Sudan Yellow 146, yielded images with optical density values of 1.65 (Black), 1.65 (Cyan), 1.45 (Magenta), 0.9 (Yellow).

U.S. Pat. No. 5,902,390 discloses an ink composition comprised of certain compounds prepared for example, by mixing 46 percent by weight of the liquid vehicle 4-ethyl cyclohexanone, 42 percent by weight of 6-dioxaspiro [4,4] nonane-2,7-dione, 3 percent by weight of the UV absorber 2-hydroxy-4-(octyloxy) benzophenone, 3 percent by weight of the antioxidant 2,2'-ethylidene-bis(4,6-di-tert-butylphenyl) fluoro phosphonite, and 6 percent by weight of a colorant such as Orasol Black RLP, Sudan Blue 670, Sudan Red 462, or Sudan Yellow 146

U.S. Pat. No. 5,922,117 discloses an ink composition comprised of alcohol compounds prepared for example, by mixing 35 percent by weight of a liquid nonyl alcohol, 35 percent by weight of the solid additive (−)-trans-ρ-menthane-3, 8-diol, 20 percent by weight of the waterfast compound tetramethylammonium fluoride tetrahydrate, 2 percent by weight of a UV absorber hexadecyl 3,5-di-tert-butyl-4-hydroxy-benzoate, 2 percent by weight of an anti-oxidant 2,2'-isobutylidene-bis(4,6-dimethyl phenol), and 6 percent by weight of a colorant selected from Orasol Black RLP, Sudan Blue 670, Sudan Red 462, or Sudan Yellow 146.

U.S. Pat. No. 5,931,995 discloses an ink composition comprised of hydroxy acids, prepared by mixing 46 percent by weight of a liquid vehicle nonanoic acid, 42 percent by weight of the solid paper additive pentadecanoic acid, 3 percent by weight of a UV absorber 2-(4-benzoyl-3-hydroxy phenoxy) ethylacrylate 3 percent by weight of an antioxidant dioctadecyl-3,3'-thiodipropionate, and 6 percent by weight of a colorant selected from Orasol Black RLP, Sudan Blue 670, Sudan Red 462, or Sudan Yellow 146, yielding images with optical density values of 1.6 (Black), 1.6 (Cyan), 1.35 (Magenta), 0.9 (Yellow).

U.S. Pat. No. 5,958,119 discloses an ink composition comprised of cyclic compounds prepared for example, by mixing 30 percent by weight of a liquid cyclic vehicle 1-acetyl-2-methyl-1-cyclopentene, 35 percent by weight of the solid paper additive 2,4,8,10-tetra oxa spiro [5.5] undecane, 20 percent by weight of the nitrile liquid crystalline compound 4'-(pentyloxy)-4-biphenyl carbonitrile, 5 percent by weight of a UV absorber 2-dodecyl-N-(2,2,6,6-tetramethyl-4-piperidinyl) succinimide, 5 percent by weight of an antioxidant tetra-sodium-N-(1,2-dicarboxyethyl)-N-octadecyl sulfosuccinamate, and 5 percent by weight of a colorant selected from Orasol Black RLP, Sudan Blue 670, or Sudan Red 462, Sudan Yellow 146 yielding images with optical density values of 1.52 (Black), 1.54 (Cyan), 1.32 (Magenta), 0.95 (Yellow).

SUMMARY OF THE INVENTION

While the known ink compositions and processes may be suitable for their intended purposes, a need remains for conductive acoustic phase-change ink compositions suitable for thermal ink jet printing. In addition, there is a need for phase-change ink compositions, which are compatible with a wide variety of plain papers and may yield photographic quality images on coated papers. Further, there is a need for phase-change ink compositions, which generate high quality, lightfast, and waterfast images on plain papers. There is also a need for phase-change ink jet ink compositions which generate high quality, fast-drying images on a wide variety of plain papers at low cost with high quality text and high quality graphics, and wherein the dye is retained on the paper surface while the ink vehicle can continue to spread within the paper structure. Further, there is a need for phase-change ink jet ink compositions, which exhibit minimal feathering. Additionally, there is a need for phase-change ink jet ink compositions, which exhibit minimal intercolor bleed. There is also a need for phase-change ink jet ink compositions, which exhibit excellent image permanence. Moreover, there is a need for phase-change ink jet ink compositions, which are suitable for use in acoustic ink jet printing processes. Additionally, there is a need for phase-change hot ink compositions suitable for ink jet printing processes wherein the substrate is heated prior to printing and is cooled to ambient temperature subsequent to printing (also known as heat and delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided. Another advantage of the phase-change inks of the present invention is that the sperulite (spherical ink crystals) size during solidification can be reduced from conventional 6 to 9 micrometers to about 2 to 4 micrometers and in certain cases to 1 to 2.5 micrometers by crystallinity inhibitor derived from low viscosity ketone compounds to improve projection efficiency and crease resistance. These and other needs can be achievable with the inks of the present invention in embodiments thereof.

DETAILED DESCRIPTION OF THE INVENTION

Aspects of the present invention relate to an ink composition comprised of (1) an ink vehicle of (a) alkyl alkyl ketones of the formula $CH_3(CH_2)_m$ CO $(CH_2)_n$ $CH_3$ where m and n represent the number of segments and wherein alkyl contains from about 1 to about 25 carbons, (b) alkyl aryl ketones where each alkyl contains from about 1 to about 20 carbons, and the aryl is anthracene, naphthalene or phenyl, (c) arylaryl ketones where each aryl is benzyl, phenyl or naphthyl, (2) an ink viscosity component, (3) a conductive compound, (4) an antioxidant compound, (5) a lightfastness component, and (6) a colorant' an ink composition wherein the ink vehicle is present in an amount of from about 2 to about 97 percent by weight, the viscosity component is present in an amount of from about 45 to about 0.5 percent by weight, the conductive compound is present in an amount of from about 30 to about 0.5 percent by weight, the antioxidant compound is present in an amount of from about 5 to about 0.5 percent by weight, the lightfastness component is present in an amount of from about 5 to about 0.5 percent by weight, and the colorant is present in an amount of from about 13 to about 1 percent by weight, and wherein the total thereof is about 100 percent; an ink composition wherein said ink vehicle possesses a melting point of about about 60° C. to about 135° C. and is optionally present in an amount of from about 2 to about 97 percent by weight and is a compound selected from the group consisting of (1) n-octyl-n-propyl ketone, (2) n-octyl-n-butylketone, (3) n-decyl-n-ethyl ketone, (4) n-undecyl-n-propyl ketone, (5) n-dodecyl-n-ethyl ketone, (6) di-n-hexylketone, (7) di-n-heptylketone, (8) di-n-octyl ketone, (9) di-n-nonyl ketone, (10) di-n-decyl ketone, (11) di-n-undecyl ketone, (12) di-n-tridecyl ketone, (13) di-n-heptadecyl ketone, (14) di-n-octadecyl ketone, (15) benzylphenyl ketone, (16) di-n-benzyl ketone, (17) diphenyl acetone, (18) distyryl ketone, (19) n-octylphenyl ketone, (20) n-undecylphenyl ketone, (21) n-pentadecylphenyl ketone, and (22) 2-naphthyl phenyl ketone; an ink composition wherein said viscosity component possesses a melting point of about 60 to about 135° C., is present in an amount of from about 45 to about 0.5 percent by weight and is a carbonate compound selected from the group consisting of (1) diphenyl carbonate, (2) benzyl 4-nitrophenyl carbonate, (3) tert-butyl 4-formyl phenyl carbonate, (4) tert-butyl 4-formyl-2-methoxyphenyl carbonate, and (5) 1,2-diphenylvinylene carbonate; an ink composition wherein the viscosity component possesses a melting point of from about 75° C. to about 125° C., is present in an amount of from about 45 to about 0.5 percent by weight and which component is a mono ketone selected from the group consisting of (1) 4,4-diphenyl-2-cyclohexen-1-one, (2) 3-(dimethyl amino)-5,5-dimethyl-2-cyclohexen-1-one, (3) 3-(2-hydroxyethylamino)-5,5-dimethyl-2 cyclohexen-1-one, (4) 4,5-diphenyl-1,3-dioxol-2-one, (5) 2-oxazolidone, (6) 4-ethoxy methylene-2-phenyl-2-oxazolin-5-one, 97, (7) 5-methoxy-1-tetralone, (8) 6-methoxy-1-tetralone, (9) 5-(hydroxy methyl)-2-pyrrolidone, (10) flavone, (11) 4-methoxy chalcone, (12) 4'-methoxy chalcone, (13) 4-(dimethyl amino) chalcone, (14) trans, trans-dibenzylidene acetone, and (15) γ-(2-naphthyl)-γ-butyro lactone; an ink composition wherein the viscosity component possesses a melting point of from about 75 to about 135° C. and is present in an amount of from about 45 to about 0.5 percent by weight is selected from the group consisting of mono ketones selected from the group consisting of (1) 1-(4(1-pyrrolidinyl)-2-butynyl)-2-pyrrolidinone sesquifumarate, (2) 6,7-dimethoxy-2,2-dimethyl-4-chromanone, (3) 2,2-dimethyl-7-ethoxy-6-methoxy-4-chromanone, (4) 5,6-dimethoxy-1-indanone, (5) 3-amino-2-ethyl-4(3H)-quinazolinone, (6) 2,6-diphenyl cyclohexanone, and (7) flavanone; an ink composition wherein the viscosity component controls or modifies the viscosity of said ink and is a diketone selected from the group consisting of (1) 1-(2-hydroxyphenyl)-3-phenyl-1,3-propanedione, (2) 1-(2-hydroxy-5-methyl phenyl)-3-phenyl-1,3-propanedione, (3) 1-(5-chloro-2-hydroxy-4-methylphenyl)-3-phenyl-1,3-propanedione, (4) tetramethyl-1,3-cyclobutane dione, (5) 4-hydroxy-5-methyl-4-cyclopentene-1,3-dione monohydrate, (6) 2,5-oxazolidine dione, (7) 5,5-dimethyl oxazolidine-2,4-dione, (8) 3,6-dimethyl-1,4-dioxane-2,5-dione, (9) 2,2-dimethyl-1,3-dioxane-4,6-dione, (10) 4,4-dimethyl-1,3-cyclohexane dione, and (11) 5-(dimethylamino methylene)-2,2-dimethyl-1,3-dioxane-4,6-dione; an ink composition wherein the conductive compound is selected from the group consisting of (1) methyl 1-adamantane sulfonate, (2) octadecyl 4 chlorobenzene sulfonate, (3) tetrabutylammonium trifluoro methane sulfonate, (4) S,S'ethylene-ρ-toluene thiosulfonate, and (5) pyridinium 3-nitrobenzene sulfonate; an ink composition wherein the antioxidant is optionally present in an amount of from about 5 to about 0.5 percent by weight and is selected from the group consisting of (1) 2-amino-4-(ethylsulfonyl)phenol, (2) 4-bromo-3,5-dimethylphenol, (3) 3-(ethylamino)-ρ-cresol, (4) tetrakis(2,4-ditert-butylphenyl)-4,4'-biphenyl phosphonite), and (5) pentaerythritol tetrakis (3,5-ditert-butyl-4-hydroxy hydrocinnamate; an ink composition wherein the lightfastness component is a UV absorbing compound optionally present in an amount of from about 5 to about 0.5 percent by weight and is selected from the group consisting of (1) 4'-iodoacetophenone, (2) 4'-hydroxy-3'-nitroacetophenone, (3) 4'-hydroxy-3'-methyl acetophenone, (4) 4'-hydroxy-2'-methyl acetophenone, (5) 3',5'-dimethoxy-4'-hydroxyacetophenone, (6) 2',4'-dihydroxy-3'-propyl acetophenone, (7) 2-hydroxy-4'-(2-hydroxyethoxy)-2-methylpropiophenone, (8) 2-benzyl-2-(dimethyl amino)-4'-morpholinobutyrophenone, and (9) 4-dodecyloxy-2-hydroxy benzophenone; an ink which provides developed images with crease values of from about 5 to 13, haze values of from about 10 to 15, gloss values of from about 80 to 85, conductivity values of from about 6.5 to about 7.5 log (pico.mho/cm) and which ink possesses an acoustic-loss value of from about 10 to about 80 dB/mm, and a viscosity of from about 5 centipoise to about 10 centipoise at a temperature of from about 125° C. to about 165° C.; a printing process which comprises (a) providing an acoustic ink printer with a pool of the liquid ink of claim 1 with a free surface, and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in imagewise pattern onto a substrate; an ink wherein the colorant is selected in an amount of from about 0.5 to about 15 percent by weight; an ink wherein the colorant is a pigment, a dye or mixtures thereof; an ink wherein the colorant is a pigment of cyan, magenta, yellow, black, or mixtures thereof; an ink wherein the alkyl alkyl ketone is (1) n-octyl-n-propyl ketone, (2) n-octyl-n-butylketone, (3) n-decyl-n-ethyl ketone, (4) n-undecyl-n-propyl ketone, (5) n-dodecyl-n-ethyl ketone, (6) di-n-hexylketone, (7) di-n-heptylketone, (8) di-n-octyl ketone, (9) di-n-nonyl ketone, (10) di-n-decyl ketone, (11) di-n-undecyl ketone, (12) di-n-tridecyl ketone, (13) di-n-heptadecyl ketone, or (14) di-n-octadecyl ketone; an ink wherein the alkyl alkyl ketone is (1) di-n-decyl ketone, (2) di-n-undecyl ketone, (3) di-n-tridecyl ketone, (4) di-n-heptadecyl ketone, or (5) di-n-octadecyl ketone; an ink composition wherein the ink vehicle is an aryl aryl ketone; an ink in wherein the alky alkyl ketone is (1) di-n-tridecyl ketone, (2) di-n-heptadecyl ketone, (3) di-n-octadecyl ketone, said alkyl aryl ketone is (1) n-octylphenyl ketone, (2) n-undecylphenyl ketone, or (3) n-pentadecylphenyl ketone and said aryl aryl ketone is (1) distyryl ketone, (2) diphenyl acetone, or (3) 2-naphthyl phenyl ketone; an ink wherein m and n are from about 1 to about 100; an ink where said m and n are from about 1 to about 25; an ink composition comprised of (1) an alkyl alkyl ketone, an alkyl aryl ketone, or an arylaryl ketone ink vehicle, (2) a ketone, (3) a conductive compound, (4) an antioxidant compound, (5) a lightfastness component, and (6) a colorant; an ink composition comprised of (1) an alkyl aryl ketone ink vehicle, (2) a ketone viscosity ink modifier, (3) a conductive compound, (4) an antioxidant compound, (5) a lightfastness component, and (6) a colorant; an ink wherein the alkyl contains form about 1 to about 25 carbon atoms and said aryl contains form about 6 to about 30 carbon atoms; an ink wherein the alkyl aryl ketone is (1) n-octylphenyl ketone, (2) n-undecylphenyl ketone or (3) n-pentadecylphenyl ketone; an ink wherein the aryl contains from about 6 to about 30 carbon atoms; an ink in the aryl aryl is (1) distyryl ketone, (2) benzylphenyl ketone, (3) di-n-benzyl ketone, (4) diphenyl acetone, (5) 2-naphthyl phenyl ketone, (6) distyryl ketone, (7) benzylphenyl ketone, (8) di-n-benzyl ketone, (9) diphenyl acetone, or (10) 2-naphthyl phenyl ketone; a conductive phase-change acoustic ink composition comprised of (1) an ink vehicle with for example, a melting point of about 75° C. and about 150° C., and preferably about 90 to 130° C. which vehicle is selected from the group consisting of an alkyl alkyl, alkyl aryl, or aryl aryl ketone, (2) a viscosity modifying compound that can reduce the viscosity of ink from about 20 to 6 centipoise and which compound is selected from mono and diketones, (3) a phase-change conductive sulfonate compound that for example, can fill the pores of paper, and which compound has a melting point of lower than about 135° C. and preferably about 70 to about 100° C., and with a low acoustic loss value of below about 100 dB/mm, (4) an antioxidant compound (5) a UV absorbing compound and (6) a colorant.

The ink vehicle is present in an amount of for example, from about 2 to about 97 percent by weight, the viscosity modifying compound is present in an amount of from about 45 to about 0.5 percent by weight, the conductive compound is present in an amount of from about 30 to about 0.5 percent by weight, the lightfastness component, such as the lightfast antioxidant compound is present in an amount of from about 5 to about 0.5 percent by weight, the lightfast UV absorbing compound is present in an amount of from about 5 to about 0.5 percent by weight, and the colorant is present in an amount of from about 13 to about 1 percent by weight. The ink composition contains, for example, the following general range amounts for (1) the ink vehicle, (2) viscosity modifier, (3) conductive compound, (4) antioxidant compound (5) lightfastness compound such as lightfastness compound, such as UV absorbing compound and (6) a colorant respectively: (2+45+30+5+5+13=100) to (97+0.5+0.5+0.5+0.5+1=100)

In the ink composition the ink vehicle is preferably present in an amount of from about 15 to about 70 percent by weight, the viscosity modifying compound is present in an amount of from about 40 to about 15 percent by weight, the conductive compound is present in an amount of from about 25 to about 10 percent by weight, the lightfast antioxidant compound is present in an amount of from about 5 to about 1 percent by weight, the lighffastness UV absorbing compound is present in an amount of from about 5 to about 1 percent by weight, and the colorant is present in an amount of from about 10 to about 3 percent by weight. The ink composition contains for example the following preferred range amounts for (1) the ink vehicle, (2) the viscosity modifier, (3) the conductive compound, (4) the antioxidant (5) the lightfastness compound and (6) a colorant, respectively, (1) (15+40+25+5+5+10=100) to (70+15+10+1+1+3=100)

Examples of solid ink vehicles with for example, melting points of from about 70 to 135° C. and preferably from about 70 to about 100° C. and present for example, in an amount of from about 2 to about 97 percent by weight, and preferably in an amount of from about 15 to about 70 percent by weight, include (a) alkyl alkyl ketones of for example the formulas $CH_3(CH_2)_m$ CO $(CH_2)_n CH_3$ where m and n vary from about 1 to about 25 carbons such as (1) n-octyl-n-propyl ketone, ICN #213357; (2) n-octyl-n-butylketone, ICN #206848; (3) n-decyl-n-ethyl ketone, ICN #204911; or (4) n-undecyl-n-propyl ketone, ICN #207355;(5) n-dodecyl-n-ethyl ketone, ICN #209666; alkyl alkyl ketones of the formulas $CH_3(CH_2)_n$ CO $(CH_2)_n CH_3$ where m and n are from about 6 to about 25 carbons such as (1) di-n-hexylketone, ICN #215620; (2) di-n-heptylketone, ICN #209745; (3) di-n-octyl ketone, ICN #204765; (4) di-n-nonyl ketone, ICN #212765; (5) di-n-decyl ketone, ICN #215139; (6) di-n-undecyl ketone, MP=68° C.; ICN #203303; (7) di-n-tridecyl ketone, MP=78° C.; ICN#213235; (8) di-n-heptadecyl ketone, MP=81° C.; ICN #201684; or (9) di-n-octadecyl ketone, MP=90° C.; ICN #201684; (b) alkyl aryl ketones where each alkyl contains from about 1 to about 20 carbons, and the aryl contains from 6 to about 30 carbon atoms, such as anthracene, naphthalene or phenyl such as (1) n-octylphenyl ketone, ICN #204935; (2) n-undecylphenyl ketone, ICN #217796; (3) n-pentadecylphenyl ketone, ICN #225428; (4)n-octadecylphenyl ketone, #00185 TCI America; (c) arylaryl ketones where each aryl is benzyl, phenyl or naphthyl such as (1) benzylphenyl ketone, ICN #202318; (2) di-n-benzyl ketone, ICN #208157; (3) diphenyl acetone, ICN #208157; ICN #206354; or (4) 2-naphthyl phenyl ketone, TCI America #B0301.

The viscosity modifying compound, that primarily functions to lower the viscosity of the inks from about 20 cps to about 6 cps thereby requiring about 3 to about 4 times less energy to jet the inks possess for example, a low acoustic loss of from about 15 to 60 dB/mm, present in an amount of from about 45 to about 0.5 percent by weight, and preferably from about 40 to about 15 percent by weight, and is selected for example, from the group consisting of (a) carbonate compounds including (1) diphenyl carbonate, (Aldrich #D20, 653-9); (2) benzyl 4-nitrophenyl carbonate, (Aldrich #27,767-3); (3) tert-butyl 4-formylphenyl carbonate, (Aldrich #39,720-2); (4) tert-butyl 4-formyl-2-methoxyphenyl carbonate, (Aldrich #41,665-7); (5) 1,2-diphenylvinylene carbonate, (Aldrich #24,583-6); (6) di-2-pyridyl thionocarbonate (Aldrich #31,102-2);

(b) solid monoketones such as (1) 4,4-diphenyl-2-cyclohexen-1-one, (Aldrich #33,938-5); (2) 3-(dimethyl amino)-5,5-dimethyl-2-cyclohexen-1-one, (Aldrich #37,910-7); (3) 3-(2-hydroxy ethyl amino)-5,5-dimethyl-2-cyclohexen-1-one, (Aldrich #37,374-5); (4) 4,5-diphenyl-1,3-dioxol-2-one (Aldrich #24,583-6); (5) 2-oxazolidone, (Aldrich #0-940-9); (6) 4-ethoxymethylene-2-phenyl-2-oxazolin-5-one (Aldrich #86,220-7); (7) 5-methoxy-1-tetralone (Aldrich #11,311-5); (8) 6-methoxy-1-tetralone, (Aldrich #M2,558-9); (9) (R)-(–)-5-(hydroxy methyl)-2-pyrrolidone (Aldrich #36,635-8); (10) (S)-(+)-5-(hydroxymethyl)-2-pyrrolidone (Aldrich #36,636-6 (11) flavone (Aldrich #F60-2); (12) 4-methoxy chalcone (Aldrich #15,758-9); hardness value of 70.2; (13) 4'-methoxy chalcone (Aldrich #15,746-5); hardness value of 83.5; (14) 4-(dimethyl amino) chalcone (Aldrich #38,415-1); (15) trans, trans-dibenzylidene acetone (Aldrich #24,642-5); (16) γ-(2-naphthyl)γ-butyro lactone, (Aldrich #40,177-3); (17) diphenyl-γ-butyro lactone (Aldrich #18,320-2); hardness value of 75; (18) 3-acetyl coumarin (Aldrich #21,467-1); (19) DL-N-acetyl homocysteine thiolactone (Aldrich #A1, 660-2); (20) 1,4-benzodioxan-6-yl methyl ketone (Aldrich #17,902-7); (21) 3H-1,2-benzodithiol-3-one (Aldrich #37,546-2); (22) 3H-1,2-benzodithiol-3-one 1,1-dioxide (Aldrich #37,547-0); (23) 2-phenyl-4H-3,1-benzoxazin-4-one (Aldrich #36,136-4); (24) trans, trans-1-(2-naphyl)-5-phenyl-2,4-pentadien-1-one (Aldrich #38,530-1); (25) trans-1-(2-naphyl)-3-phenyl-2-propen-1-one (Aldrich #38,532-8); (26) di-2-thienyl ketone, (Aldrich #44,937-7); (27) 2,6-dimethyl-4H-pyran-4-one (Aldrich #D18,340-7); (28) distyryl ketone, ICN #209984; (29) 3,4-dimethoxy phenyl acetone, ICN #225828; (30) 4-(4-hydroxy-3-methoxy phenyl)-3-buten-2-one (Aldrich #30,604-5); (31) 5,6-dihydro-4-hydroxy-6-methyl-2H-pyran-2-one (Aldrich #30,968-0); (32) (2-hydroxy phenyl)-1-phenyl-1H-pyrazol-4-yl ketone (Aldrich #41,776-9); (33) benzyl 2,4-dihydroxy phenyl ketone (Aldrich #43,849-9); (34) trans,trans-dibenzylidene acetone (Aldrich #24,642-5);

(c) monoketones such as (1) diphenyl cyclo propenone (Aldrich #17,737-7); (2) trans-2,3-epoxy-1,3-diphenyl-1-propanone (Aldrich #44,296-8); (3) 4-(4-hydroxyphenyl)-2-butanone (Aldrich #17,851-9); hardness value of 75.4; (4) dihydro-3-hydroxy-4,4-dimethyl-2(3H)furanone (Aldrich #23,781-7); (5) 2,5-dimethyl-4-hydroxy-3(2H)-furanone (Aldrich #32, 248-2); (Aldrich #30,410-7); (Aldrich #43,732-8); (6) (S)-(+)-dihydro-5-(ρ-tolyl sulfonyl oxymethyl)-2(3H)-furanone (Aldrich #36,456-8); (7) (S)-(+)-3-acetyl-4-benzyl-2-oxazolid (Aldrich #42,164-2); (8)(S)-(–)-4-benzyl-2-oxazolidinone (Aldrich #29,464-0); (R)-(+)-4-benzyl-2-oxa zolidinone, (Aldrich #30,097-7); (9) 1,3-diacetyl 2-imidazolidinone (Aldrich #34078-2); (10) 1-(benzyloxy carbonyl)-2-tert-butyl-3-methyl-4-imidazolidinone (Aldrich #33,756-0); (Aldrich #33, 757-90); (11) 1 ethyl-2-benzimidazolinone (Aldrich #38,264-7); (12) {1-(4(1-pyrrolidinyl)-2-butynyl)-2-pyrrolidinone sesquifumarate (Aldrich #10,832-4); (13) 6,7-dimethoxy-2,2-dimethyl-4-chromanone (Aldrich #30,063-2); (14) 2,2-dimethyl-7-ethoxy-6-methoxy-4-chromanone (Aldrich #29,623-6); (15) 5,6-dimethoxy-1-indanone (Aldrich #14,782-6); (16) 3-amino-2-ethyl-4(3H)-quinazolinone, (Aldrich #38, 632-4); (17) 2,6-diphenyl cyclohexanone, (Aldrich #42,471-4); (18) flavanone, (Aldrich #10,203-2); or (d) diketones such as (1) 1-(2-hydroxyphenyl)-3-phenyl-1,3-propanedione (Aldrich #41,739-4); (2) 1-(2-hydroxy-5-methy phenyl)-3-phenyl-1,3-propanedione (Aldrich #41,740-8); (3) 1-(5-chloro-2-hydroxy-4-methylphenyl)-3-phenyl-1,3-propane dione (Aldrich #41,741-6); (4) tetramethyl-1,3-cyclobutanedione (Aldrich #T2,100-84); (5) 4-hydroxy-5-methyl-4-cyclopentene-1,3-dione monohydrate (Aldrich #32, 299-7); (6) 2,5-oxazolidine dione (Aldrich #36,977-2);

(7) 5,5-dimethyl oxazolidine-2,4-dione (Aldrich #21, 900-2); (8) 3,6-dimethyl-1,4-dioxane-2,5-dione (Aldrich #30,314-3); (9) 2,2-dimethyl-1,3-dioxane-4,6-dione (Aldrich #21,014-5); (10) 4,4-dimethyl-1,3-cyclohexane dione (Aldrich #34,125-8); (11) 5-(dimethylamino methylene)-2,2-dimethyl-1,3-dioxane-4,6-dione (Aldrich#34,123-1);

The conductive compounds that impart conductivity to the ink composition and present for example, in an amount of from about 30 to about 0.5 percent by weight and preferably from about 25 to about 10 percent by weight include (1) methyl 1-adamantane sulfonate,115, (Aldrich #40, 956-1); (2) octadecyl 4-chlorobenzene sulfonate (Aldrich #47,799-0); (3) tetrabutylammonium trifluoro methanesulfonate (Aldrich #34,509-1); (4) S,S'-ethylene-ρ-toluene thiosulfonate (Aldrich #23,257-2); (5) pyridinium 3-nitrobenzene sulfonate (Aldrich #27,198-5), and the like.

Lighffast antioxidant compounds that primarily protect the developed images from oxidation and which are present in the ink composition in an amount of for example, from about 5 to about 0.5 percent by weight and preferably from about 5 to about 1 percent by weight include (1) 2-amino-4-(ethylsulfonyl) phenol (Aldrich #32,919-3); (2) 4-bromo-3,5-dimethylphenol (Aldrich B6,420-2), (3) 3-(ethylamino)-ρ-cresol (Aldrich #27,523-9); (4) tetrakis (2,4-ditert-butylphenyl)-4,4'-biphenylphosphonite), hardness value 89.5 (Aldrich #46,852-5); (5) pentaerythritol tetrakis(3,5-ditert-butyl-4-hydroxy hydrocinnamate, hardness value 88, (Aldrich #36,937-3) measured after melting and then cooling; on a scale of 1 to 100, 88 is a very good hardness value.

Lightfastness components such as lighffast UV absorbing compounds that primarily protect the developed images from sunlight and which are present in the ink composition in an amount of for example, from about 5 to about 0.5 percent by weight and preferably from about 5 to about 1 percent by weight include (1) 4'-iodoacetophenone (Aldrich #35,780-4); (2) 4'-hydroxy-3'-nitroacetophenone (Aldrich #33,025-6); (3) 4'-hydroxy-3'-methyl acetophenone, (Aldrich #H3,800-4); 4'-hydroxy-2'-methyl acetophenone (Aldrich #H3,780-6); (4) 3',5'-dimethoxy-4'-hydroxy acetophenone (Aldrich #D13,440-6); (5) 2',4'-dihydroxy-3'-propyl acetophenone (Aldrich #42,690-3); (6) 2-hydroxy-4'-(2-hydroxyethoxy)-2-methylpropiophenone (Aldrich #41,089-6); (7) 2-benzyl-2-(dimethyl amino)-4'-morpholinobutyrophenone (Aldrich #40,564-7); (8) 4-dodecyloxy-2-hydroxy benzophenone, ICN #213338, and the like, inclusive of other known lightfastness compounds.

Suitable colorants, present in an effective amount generally of from about 15 to about 0.5 percent by weight, and preferably from about 10 to about 3 percent by weight, include pigments and dyes, with solvent dyes being preferred. Various dyes or pigments may be selected providing that it is for example, capable of being dispersed or dissolved in the vehicle and is compatible with the other ink components. Colorants include pigments, dyes, mixtures thereof, mixtures of dyes, mixtures of pigments, and the like.

Examples of pigments include Violet Toner VT-8015 (Paul Uhlich), Paliogen Violet 5100 (BASF), Paliogen Violet 5890 (BASF), Permanent Violet VT 2645 (Paul Uhlich), Heliogen Green L8730 (BASF), Argyle Green XP-111-S (Paul Uhlich), Brilliant Green Toner GR 0991 (Paul Uhlich), Lithol Scarlet D3700 (BASF), Toluidine Red (Aldrich), Scarlet for Thermoplast NSD PS PA (Ugine Kuhlmann of Canada), E.D.Toluidine Red (Aldrich), Lithol Rubine Toner (Paul Uhlich), Lithol Scarlet 4440 (BASF), Bon Red C (Dominion Color Company),Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01 (American Hoechst), Irgalite Blue BCA (Ciba-Geigy), Paliogen Blue 6470 (BASF), Sudan III (Red Orange), (Matheson,Colemen Bell), Sudan II (Orange), (Matheson, Colemen Bell), Sudan Orange G (Aldrich), Sudan Orange 220 (BASF), Paliogen Orange 3040 (BASF), Ortho Orange OR 2673 (Paul Uhlich), Paliogen Yellow 152,1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Yellow L1250 (BASF),Suco-Yellow D1355 (BASF), Suco Fast Yellow D1355, D1351 (BASF), Hostaperm Pink E (American Hoechst), Fanal Pink D4830 (BASF), Cinquasia Magenta (DuPont), Paliogen Black L0084 (BASF), Pigment Black K801 (BASF), and carbon blacks such as Regal 330® (Cabot), Carbon Black 5250, Carbon Black 5750 (Columbia Chemical Company).

Examples of dyes include Pontamine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz,Inc.; Tartrazine Extra Conc. (FD&C Yellow #5, Acid Yellow 23),available from Sandoz,Inc.; Carodirect Yellow RL (Direct Yellow 86), available from Carolina Color and Chemical; Cartasol Yellow GTF Liquid Special 110, available from Sandoz,Inc.; D&C Yellow #10 (Acid Yellow 3), available from Tricon; Yellow Shade 16948, available from Tricon; Basacid Black X 34, available from BASF; Carta Black 2GT, available from Sandoz,Inc.; and the like. Particularly preferred are solvent dyes, and within the class of solvent dyes, spirit soluble dyes are preferred primarily because of their compatibility with the ink vehicle of the present application. Examples of suitable spirit solvent dyes include Neozapon Red 492 (BASF), Orasol Red G (Ciba-Geigy), Direct Brilliant Pink B (Crompton-Knolls), Aizen Spilon Red C-BH (Hodogaya Chemical Company), Kayanol Red 3BL (Nippon Kayaku Company). Levanol Brilliant Red 3BW (Mobay Chemical Company), Levaderm Lemon Yellow (Mobay Chemical Company), Spirit Fast Yellow 3G, Aizen Spilon Yellow C-GNH (Hodogaya Chemical Company), Sirius Supra Yellow GD 167, Cartasol Brilliant Yellow 4GF (Sandoz), Pergasol Yellow CGP (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc.A (Morton-Thiokol), Diaazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), and the like. Neozapon Black X51 [C.I. Solvent Black; C.I. #12195] (BASF); Sudan Blue 670 [C.I. #61554] (BASF); Sudan Yellow 146 [C.I. #12700] (BASF); Sudan Red 462 [C.I. #26050] (BASF) are preferred.

The inks of the present invention can be prepared by any suitable method. A colored phase-change ink composition was prepared by mixing 40 percent by weight of an alkyl ketone such as di-n-octadecyl ketone, (ink vehicle; ICN #201684; acoustic-loss value 48 dB/mm; melting point 90° C.), 30 percent by weight of 1,3-diacetyl 2-imidazolidinone, (viscosity modifier; Aldrich #34078-2; acoustic-loss value 25 dB/mm; melting point 127° C.), 20 percent by weight of methyl 1-adamantane sulfonate, (conductive salt; Aldrich #40,956-1; melting point 115° C.; acoustic-loss value 29 dB/mm; conductivity 8.5 log(pico.mho/cm), 3 percent by weight of tetrakis(2,4-ditert butyl phenyl)-4,4'-biphenyl diphosphonite, (antioxidant; Aldrich #46,852-; hardness value 90), 2 percent by weight of 4'-iodoacetophenone, (UV absorber, melting point 83° C. Aldrich #35,780-4); and 5 percent by weight of the colorant. The mixture was heated to a temperature of about 140° C. and stirred for a period of about 60 minutes until it formed a homogeneous solution, and subsequently the solution cooled to 25° C. The resulting black ink yielded a hardness value of 80 at 23° C. with an acoustic loss value 60 dB/mm, viscosity 6.5 cps, conductivity 6.7 log (pico.mho/cm) at 150° C.

The inks of the present invention are particularly suitable for printing processes wherein the substrate, such as paper, transparency material, or the like, is heated during the printing process to facilitate formation of the liquid crystalline phase within the ink. When transparency substrates are employed, temperatures typically are specially formulated transparencies and paper substrates can, however, tolerate higher temperatures, and frequently are suitable for exposure to temperatures of 150° C. or even 200° C. in some instances. Typical heating temperatures are from about 40° C. to about 140° C., and preferably from about 60° C. to about 95° C., although the temperature can be outside these ranges.

The inks of the present invention are also suitable for use in acoustic ink jet printing processes. In acoustic ink jet printing, reference a number of the copending applications and patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, U.S. Pat. No. 4,745,419 entitled "Hot Melt Ink Acoustic Printing", and IBM Technical Disclosure Bulletin, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered.

Pixel placement accuracy problems that conventional drop on demand and continuous stream ink jet printers has suffered. The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks with for example, higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), however in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. AppL Phys.*, vol. 65, no. 9 (May 1, 1989) and references therein, the disclosure of which is totally incorporated herein by reference.

Acoustic-loss Measurements recited herein were measured as follows: samples of various liquid vehicles and solid paper surface leveling compounds were placed about the two transducers, with the temperature set at 150° C. The samples were let to equilibrate at 150° C. for five minutes. The two transducers were brought together to maximize the acoustic signal. The amplitude and the position of the signals were recorded. The two transducers were separated by a distance varying from 25.4 microns to 125.4 microns recording each time the amplitude and the position of the signal. Each measurement was performed three times and three samples of the same material. were measured. The attenuation dB/mm was then calculated by ratioing the amplitude values obtained at different separation distances.

The alkyl ketones, mono and diketone compounds can be considered for example, as being crystalline or semicrystalline in the solid state. When solidified on a substrate such as paper or transparency they crystallize in spherulitic (spherical crystals) morphology, and wherein the size of the spehrulites are from about 0.1 to about 10 microns and preferably about 1 to about 4 microns, for optimum projection efficiency and excellent crease efficiency. The spherulite size can be measured by an optical microscope with cross polarized light or by the low angle solid state light scattering method (R. S. Stein and M. B. Rhodes, *J. AppL Phys.*, 31, 1873 (1960)). A monochromatic, vertically polarized light is passed through the sample. The scattered light is analyzed with another nicol prism, with its optic axis horizontal. This is conventionally known as the $H_v$ scattering method. The spherulite size is measured from the location of the maximum intensity in the four-leaf clover scattering pattern.

Optical density values of for example, black [Neozapon Black X51 C.I. #12195] about 2.1 to 2.3, cyan [Sudan Blue 670 C.I. #61554] about 1.80 to 1.85, Magenta Sudan Red 462 [C.I. #26050], about 1.90 to 1.95, and yellow [Sudan Yellow 146 C.I. #12700 about 1.37 to 1.45], recited herein were obtained on a Pacific Spectrograph Color System. The system consists of two major components, an optical sensor and a data terminal. The optical sensor employs a 6-inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information The lightfast values of ink jet images of for example, about 90 to 100 percent and preferably about 95 to 100 percent were measured in the Mark V Lightfast Tester obtained from Microscal Company, London, England.

The waterfast values of the above ink jet images of for example, are about 90 to 100 percent and preferably about 95 to 100 percent were obtained from the optical density data recorded before and after washing with water at 25° C. for five minutes.

The viscosity values can be measured at 150° C. with a Stress Rheometer from Cari-Med model CSL 100. All experiments were performed at a shear rate of 1,250 s$^{-1}$.

The conductivity values expressed as log (picomho/cm) and measured for example, under melt conditions at 150° C. by placing an aluminum electrode in the melt and reading the resistivity output on a GenRad 1689 precision RLC Digibridge at a frequency of 1 K.Hz. Conductivity is calculated from the resistivity data.

The average width of the creased image due to pressure was obtained on colored and black solid area images printed on paper by (a) folding inwards the printed area of the image, (b) passing on the folded image a standard TEFLON coated copper roll 2 inches in width, 3 inches in outer diameter, 2.25 inches in inner diameter and weighing 860 grams, (c) unfolding the paper and wiping the loose toner from the creased imaged surface with a cotton swab, (d) measuring the average width of the toner free creased area with an image analyzer.

The haze values of images of for example, about 10 to 30 and preferably about 10 to 20 recited herein were measured on images printed on uncoated polyester such as MYLAR® with a Haze meter XL-211, HAZEGARD® System obtained from Pacific Scientific Company.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A black phase-change ink composition was prepared by mixing 40 percent by weight of the dialkyl ketone di-n-octadecyl ketone, (ink vehicle; ICN #201684; acoustic-loss value 48 dB/mm; melting point 90° C.), (a dialkyl ketone) 30 percent by weight of 1,3-diacetyl 2-imidazolidinone, (viscosity modifier ketone); Aldrich #34078-2; acoustic-loss value 25 dB/mm; melting point 127° C.), 20 percent by weight methyl 1-adamantane sulfonate, (conductive salt; Aldrich #40,956-1; melting point 115° C.; acoustic-loss value 29 dB/mm; conductivity 8.5 log(pico.mho/cm), 3 percent by weight of tetrakis(2,4-ditert butyl phenyl)-4,4'-biphenyl diphosphonite, (antioxidant; Aldrich #46,852-; hardness value 90), 2 percent by weight of 4'-iodoacetophenone, (UV absorber,melting point 83° C., Aldrich #35,780-4); and 5 percent by weight of Neozapon Black X51 dye (C.I. Solvent Black; C.I. #12195) (obtained from BASF). The mixture was heated to a temperature of about 140° C. and stirred for a period of about 60 minutes until it formed a homogeneous solution, and subsequently the solution was air cooled to 25° C. The resulting black ink was comprised of 40 percent by weight of di-n-octadecyl ketone, 30 percent by weight 1,3-diacetyl 2-imidazolidinone, 20 percent by weight of methyl 1-adamantane sulfonate, 3 percent by weight tetrakis (2,4-ditert butyl phenyl)-4,4'-biphenyl diphosphonite, 2 percent by weight of 4'-iodoacetophenone and 5 percent by weight of Neozapon Black X51 dye (C.I. Solvent Black; C.I. #12195) (obtained from BASF), and which ink yielded a hardness value of 80 at 23° C. with an acoustic loss value of 60 dB/mm, a viscosity of 6.5 cps, and a conductivity of 6.7 log (pico.mho/cm) at 150° C.

EXAMPLE II

A blue phase-change ink composition was prepared by mixing 40 percent by weight of di-n-undecyl ketone, (ink vehicle; ICN #203303; acoustic-loss value 44 dB/mm; melting point 68° C.), 30 percent by weight of diphenyl carbonate, (viscosity modifier; Aldrich #D20,653-9; acoustic-loss value 22 dB/mm; melting point 82° C.), 20 percent by weight of octadecyl 4-chlorobenzene sulfonate, (Aldrich #47, 799-0; melting point 66° C.; acoustic-loss value 29 dB/mm; conductivity 8.4 log(pico.mho/cm), 2 percent by weight of tetrakis(2,4-ditert butyl phenyl)-4,4'-biphenyl diphosphonite, (Aldrich #46,852-5, hardness value 90), 3 percent by weight of 4'-hydroxy-3'- nitroacetophenone, (UV absorber, melting point 134° C., (Aldrich #33,025-6) and 5 percent by weight of Sudan Blue 670 dye (C.I.#61554) (obtained from BASF). The mixture was heated to a temperature of about 140° C. and stirred for a period of about 60 minutes until it formed a homogeneous solution, and the solution subsequently air cooled to 25° C. The resulting blue ink comprised of 40 percent by weight of di-n-undecyl ketone, 30 percent by weight of diphenyl carbonate, 20 percent by weight of octadecyl 4-chlorobenzene sulfonate, 2 percent by weight of tetrakis (2,4-ditert butyl phenyl)-4,4'-biphenyl diphosphonite' 3 percent by weight of 4'-hydroxy-3'-nitroacetophenone, and 5 percent by weight of Sudan Blue 670 dye possessed a hardness value of 81 at 23° C., an acoustic loss value of 68 dB/mm, a viscosity of 6.7 of cps at 150° C. and a conductivity of 6.8. log(pico.mho/cm) at 150° C.

EXAMPLE III

A yellow phase-change ink composition was prepared by mixing 40 percent by weight of di-n-tridecyl ketone, (ink vehicle; ICN #213235; acoustic-loss value 46 dB/mm; melting point 78° C.), 30 percent by weight of 4'-methoxy chalcone, (viscosity modifier; Aldrich #15,746-5; hardness value of 83.5; acoustic-loss value 24 dB/mm; melting point 103° C.), 20 percent by weight of tetrabutylammonium trifluoro methanesulfonate, (conductive salt; Aldrich #34,509-1; melting point 115° C.; acoustic-loss value 29 dB/mm; conductivity 8.1 log(pico.mho/cm), 2 percent by weight of tetrakis(2,4-ditert butyl phenyl)-4,4'-biphenyl diphosphonite, (antioxidant; Aldrich #46,852-5); hardness value 90), 3 percent by weight of 4'-hydroxy-3'-methyl acetophenone, (UV absorber, melting point 108° C., Aldrich #H3,800-4); and 5 percent by weight of Sudan Yellow 146 dye (C.I. #12700) (obtained from BASF). The mixture was heated to a temperature of about 140° C. and stirred for a period of about 60 minutes until it formed a homogeneous solution, and subsequently air cooled to 25° C. The resulting yellow ink comprised of 40 percent by weight of di-n-tridecyl ketone, 30 percent by weight of 4'-methoxy chalcone, 20 percent by weight of tetrabutylammonium trifluoro methanesulfonate, 2 percent by weight of tetrakis (2,4-ditert butyl phenyl)-4,4'-biphenyl diphosphonite, 3 percent by weight of 4'-hydroxy-3'-methyl acetophenone, and 5 percent by weight of Sudan Yellow 146 dye possessed a hardness value of 79 at 23° C., an acoustic loss value of 67 dB/mm, a viscosity of 6.9 cps, and a conductivity of 7.0log(pico.mho/cm) at 150° C.

EXAMPLE IV

A magenta phase-change ink composition was prepared by mixing 35 percent by weight of di-n-heptadecyl ketone, (ink vehicle; ICN #201684; acoustic-loss value 47 dB/mm melting point 81° C.), 35 percent by weight of 2,6-dimethyl-4H-pyran-4-one, (viscosity modifier); Aldrich #D!8,340-7; acoustic-loss value 34 dB/mm; melting point 135° C.), 20 percent by weight of S,S'ethylene-ρ-toluene thiosulfonate, (conductive salt; Aldrich #23,257-2); melting point 75° C.; acoustic-loss value 32 dB/mm; conductivity 8.8 log (pico.mho/cm), 2 percent by weight of tetrakis(2,4-ditert butyl phenyl)-4,4'-biphenyl diphosphonite, (Aldrich #46,852-5,) hardness value 90), 3 percent by weight of 4'-hydroxy-2'-methyl acetophenone, (UV absorber, melting point 130° C., Aldrich #H3,780-6); and 5 percent by weight of Sudan Red 462 dye (C.I.#26050) (obtained from BASF). The mixture was heated to a temperature of about 140° C. and stirred for a period of about 60 minutes until it formed a homogeneous solution, and subsequently was air cooled to 25° C. The resulting magenta ink comprised of 35 percent by weight of di-n-heptadecyl ketone, 35 percent by weight of 2,6-dimethyl-4H-pyran-4-one, 20 percent by weight of S,S'ethylene-ρ-toluene thiosulfonate, 2 percent by weight of tetrakis (2,4-ditert butyl phenyl)-4,4'-biphenyl diphosphonite, 3 percent by weight of 4'-hydroxy-2'-methyl acetophenone and 5 percent by weight of Sudan Red 462 dye (C.I. #26050) possessed a hardness value of 81 at 23° C. an acoustic loss value of 70 dB/mm, a viscosity 6.9 cps, and a conductivity of 7.3log(pico.mho/cm) at 150° C.

EXAMPLE V

Each of the inks prepared as described in Examples I through IV was incorporated into an acoustic ink jet printing test fixture utilizing the ejection mechanism disclosed in *J. Appl. Phys.*, 65(9), May 1, 1989, and references therein, the disclosures of each of which are totally incorporated herein by reference. A jetting frequency of 160 MHz was used to generate drops of about 2 picoliters, up to 12 drops per pixel at 600 spi. The images formed on paper exhibited excellent color quality with hardness values of 80±1 at 23° C. and with optical density values of 2.40 (black), 1.90 (cyan), 2.25 (magenta), 1.5 (yellow), crease values of 0.10 millimeter (black), 0.08 millimeter (magenta), 0.09 millimeter (cyan), 0.08 (yellow), gloss values of 85 (black), 82 (magenta), 82 (cyan), 80 (yellow), ink spherulite radius of from about 1 to 2 micrometer and which size enables haze values of 10 (black), 9 (magenta), 9 (cyan), 6 (yellow), when printed on transparencies. The lightfast values of images for each of the above inks on paper were 98.2 percent (black), 98.5 percent (cyan), 95.5 percent (magenta), 96.8 percent (yellow) The waterfast values of images for each of the above inks on paper were 97.5 percent (black), 97.2 percent (cyan), 96.5 percent (magenta), 96.2 percent (yellow).

EXAMPLE VI

A black phase-change ink composition was prepared by mixing 40 percent by weight of di-n-octadecyl ketone, (ICN #201684; acoustic-loss value 48 dB/mm; melting point 90° C.), 30 percent by weight of diphenyl-γ-butyro lactone, (Aldrich #18,320-2; hardness value 75; acoustic-loss value 25 dB/mm; melting point 78° C.), 20 percent by weight of methyl 1-adamantane sulfonate, (Aldrich #40,956-1; melting point 115° C; acoustic-loss value 29 dB/mm; conductivity of 8.5 log(pico.mho/cm); 2 percent by weight of 2-amino-4-(ethylsulfonyl) phenol, (Aldrich #32,919-3);3 percent by weight of 3',5'-dimethoxy-4'-hydroxy acetophenone,(UV absorber, melting point 126° C., Aldrich #D13,440-6); and 5 percent by weight of Neozapon Black X51 dye (C.I. Solvent Black; C.I. #12195) (obtained from BASF). The mixture was heated to a temperature of about 140° C. and stirred for a period of about 60 minutes until it formed a homogeneous solution, and subsequently air cooled to 25° C. The resulting black ink comprised of 40 percent by weight of di-n-octadecyl ketone, 30 percent by weight of diphenyl-γ-butyro lactone, 20 percent by weight of methyl 1-adamantane sulfonate, 2 percent by weight of 2-amino-4-(ethylsulfonyl) phenol, 3 percent by weight of 3',5'-dimethoxy-4'-hydroxy acetophenone and 5 percent by weight of Neozapon Black X51 dye possessed a hardness value of 80 at 23° C., an acoustic loss value of 70 dB/mm, a viscosity of 6.5 cps, viscosity was at 150° C. in the EXAMPLES and a conductivity of 6.7 log(pico.mho/cm) at 150° C.

EXAMPLE VII

A blue phase-change ink composition was prepared by mixing 40 percent by weight of 2-naphthyl phenyl ketone (TCI America #B0301; acoustic-loss value 40 dB/mm; melting point 82° C.), 30 percent by weight of 4-(4-hydroxyphenyl)-2-butan (Aldrich #17,851-9;) hardness value of 75.4; acoustic-loss value 22 dB/mm; melting point 83° C.), 20 percent by weight of octadecyl 4-chlorobenzene sulfonate, (Aldrich #47, 799-0; melting point 66° C.; acoustic-loss value 29 dB/mm; conductivity 8.4 log (pico.mho/cm), 2 percent by weight of 2-amino-4-(ethylsulfonyl) phenol, (Aldrich #32,919-3), 3 percent by weight of 2',4'-dihydroxy-3'-propyl acetophenone, (UV absorber, melting point 126° C., Aldrich #42,690-3) and 5 percent by weight of Sudan Blue 670 dye (C.I. #61554) (obtained from BASF). The mixture was heated to a temperature of about 140° C. and stirred for a period of about 60 minutes until it formed a homogeneous solution, and subsequently air cooled to 25° C. The resulting blue ink comprised of 40 percent by weight of 2-naphthyl phenyl ketone 30 percent by weight of 4-(4-hydroxyphenyl)-2-butanone, 20 percent by weight of octadecyl 4-chlorobenzene sulfonate, 2 percent by weight of 2-amino-4-(ethylsulfonyl) phenol, 3 percent by weight of 2',4'-dihydroxy-3'-propyl acetophenone, and 5 percent by weight of Sudan Blue 670 dye possessed a hardness value of 79 at 23° C., an acoustic loss value of 65 dB/mm, a viscosity of 6.7 cps, and a conductivity of 6.8. Log (pico.mho/cm) at 150° C.

EXAMPLE VIII

A yellow phase-change ink composition was prepared by mixing 40 percent by weight of di-n-tridecyl ketone (ICN #213235; acoustic-loss value 46 dB/mm; melting point 78° C.), 30 percent by weight of 1-(2-hydroxy-5-methyl phenyl)-3-phenyl-1,3-propanedione (Aldrich #41,740-8; acoustic-loss value 24 dB/mm; melting point 93° C.), 20 percent by weight of tetrabutylammonium trifluoro methanesulfonate (Aldrich #34, 509-1; melting point 115° C.; acoustic-loss value 29 dB/mm; conductivity 8.1 log (pico.mho/cm), 2 percent by weight of 2-amino-4-(ethylsulfonyl) phenol, (Aldrich #32,919-3), 3 percent by weight of 2-hydroxy-4'-(2-hydroxyethoxy)-2-methylpropiophenone, (UV absorber, melting point 89° C., Aldrich #41,089-6); and 5 percent by weight of Sudan Yellow 146 dye (C.I. #12700) (obtained from BASF). The mixture was heated to a temperature of about 140° C. and stirred for a period of about 60 minutes until it formed a homogeneous solution, and subsequently cooled to 25° C. The resulting yellow ink comprised of 40 percent by weight of di-n-tridecyl ketone, 30 percent by weight of 1-(2-hydroxy-5-methyl phenyl)-3-phenyl-1,3-propanedione, 20 percent by weight of tetrabutylammonium trifluoro methanesulfonate, 2 percent by weight of 2-amino-4-(ethylsulfonyl) phenol, 3 percent by weight of 2-hydroxy-4'-(2-hydroxyethoxy)-2-methylpropiophenone, and 5 percent by weight of Sudan Yellow 146 dye yielded a hardness value of 81 at 23° C. with an acoustic loss value 67 dB/mm, a viscosity of 6.9 cps, and a conductivity of 7.0 log (pico.mho/cm) at 150° C.

EXAMPLE IX

A magenta phase-change ink composition was prepared by mixing 35 percent by weight of the ink vehicle di-n-heptadecyl ketone, (ICN #201684; acoustic-loss value 47 dB/mm; melting point 81° C.), 35 percent by weight of 4,4-dimethyl-1,3-cyclohexane dione, (Aldrich #34,125-8; acoustic-loss value 24 dB/mm; melting point 104° C.), 20 percent by weight of S,S'ethylene-ρ-toluene thiosulfonate, (Aldrich #23,257-2; melting point 75° C; acoustic-loss value 32 dB/mm; conductivity 8.8 log(pico.mho/cm), 2 percent by weight of 2-amino-4-(ethylsulfonyl) phenol, (Aldrich #32, 919-3), 3 percent by weight of 2-benzyl-2-(dimethyl amino)-4'-morpholinobutyrophenone, (UV absorber, melting point 117° C., (Aldrich #40,564-7); and 5 percent by weight of Sudan Red 462 dye (C.I. #26050) (obtained from BASF). The mixture was heated to a temperature of about 140° C. and stirred for a period of about 60 minutes until it formed a homogeneous solution, and subsequently air cooled to 25° C. The resulting magenta ink comprised of 35 percent by weight of the ink vehicle di-n-heptadecyl ketone, 35 percent by weight of 4,4-dimethyl-1,3-cyclohexane dione, 20 percent by weight of S,S'ethylene-ρ-toluene thiosulfonate, 2 percent by weight of 2-amino-4-(ethylsulfonyl) phenol, 3 percent by weight of 2-benzyl-2-(dimethyl amino)-4'-morpholinobutyrophenone, and 5 percent by weight of Sudan Red 462 dye possessed a hardness value of 78 at 23° C., an acoustic loss value of 75 dB/mm, a viscosity of 6.9 cps, and a conductivity of 7.3 log (pico.mho/cm) at 150° C.

EXAMPLE X

Each of the inks prepared as described in Examples VI through IX was incorporated into an acoustic ink jet printing test fixture utilizing the ejection mechanism disclosed in *J. Appl. Phys.*, 65(9), May 1, 1989, and references therein, the disclosures of each of which are totally incorporated herein by reference. A jetting frequency of 160 MHz was used to generate drops of about 2 picoliters, up to 12 drops per pixel at 600 spi. The images formed on paper exhibited excellent color quality with hardness values of 79.5±1.5 at 23° C., optical density values of 2.55 (black), 2.05 (cyan), 2.25 (magenta), 1.55 (yellow), crease values of 0.10 millimeter (black), 0.08 millimeter (magenta), 0.07 millimeter (cyan), 0.08 millimeter (yellow), gloss values of 82 (black), 85 (magenta), 85 (cyan), 80 (yellow), ink spherulite radius of from about 1 to 2 micrometer and which size enables haze values of 10 (black), 9 (magenta), 8 (cyan), 10 (yellow), when printed on transparencies. The lightfast values of images for each of the above inks on paper were 97.2 percent (black), 98.0 percent (cyan), 96.5 percent (magenta), 96.1 percent (yellow). The waterfast values of images for each of the above inks on paper were 97.7 percent (black), 97.8 percent (cyan), 96.1 percent (magenta), 96.4 percent (yellow).

Other modifications of the present invention may occur to those of ordinary skill in the art subsequent to a review of the present application, and these modifications, including equivalents thereof, are intended to be included within the scope of the present invention.

What is claimed is:

1. An ink composition comprised of (1) an ink vehicle of (a) alkyl alkyl ketones of the formula $CH_3(CH_2)_m$ CO $(CH_2)_n$ $CH_3$ where m and n represent the number of segments and wherein alkyl contains from about 1 to about 25 carbons, (b) alkyl aryl ketones where each alkyl contains from about 1 to about 20 carbons, and the aryl is anthracene, naphthalene or phenyl, or (c) arylaryl ketones where each aryl is benzyl, phenyl or naphthyl, (2) an ink viscosity component, (3) a conductive compound, (4) an antioxidant compound, (5) a lightfastness component, and (6) a colorant.

2. An ink composition in accordance with claim 1 wherein the ink vehicle is present in an amount of from about 2 to about 97 percent by weight, the viscosity component is present in an amount of from about 45 to about 0.5 percent by weight, the conductive compound is present in an amount of from about 30 to about 0.5 percent by weight, the antioxidant compound is present in an amount of from about 5 to about 0.5 percent by weight, the lightfastness component is present in an amount of from about 5 to about 0.5 percent by weight, and the colorant is present in an amount of from about 13 to about 1 percent by weight, and wherein the total thereof is about 100 percent.

3. An ink composition in accordance with claim 1 wherein said ink vehicle possesses a melting point of about 60° C. to about 135° C. and is present in an amount of from about 2 to about 97 percent by weight and is a compound selected from the group consisting of (1) n-octyl-n-propyl ketone, (2) n-octyl-n-butylketone, (3) n-decyl-n-ethyl ketone, (4) n-undecyl-n-propyl ketone, (5) n-dodecyl-n-ethyl ketone, (6) di-n-hexylketone, (7) di-n-heptylketone, (8) di-n-octyl ketone, (9) di-n-nonyl ketone, (10) di-n-decyl ketone, (11) di-n-undecyl ketone, (12) di-n-tridecyl ketone, (13) di-n-heptadecyl ketone, (14) di-n-octadecyl ketone, (15) benzylphenyl ketone, (16) di-n-benzyl ketone, (17) diphenyl acetone, (18) distyryl ketone, (19) n-octylphenyl ketone, (20) n-undecylphenyl ketone, (21) n-pentadecylphenyl ketone, and (22) 2-naphthyl phenyl ketone.

4. An ink composition in accordance with claim 1 wherein said viscosity component possesses a melting point of about 60 to about 135° C., is present in an amount of from about 45 to about 0.5 percent by weight and is a carbonate compound selected from the group consisting of (1) diphenyl carbonate, (2) benzyl 4-nitrophenyl carbonate, (3) tert-butyl 4-formyl phenyl carbonate, (4) tert-butyl 4-formyl-2-methoxyphenyl carbonate, and (5) 1,2-diphenylvinylene carbonate.

5. An ink composition in accordance with claim 1 wherein said viscosity component which possesses a melting point of from about 75° C. to about 125° C., is present in an amount of from about 45 to about 0.5 percent by weight and which component is a ketone selected from the group consisting of (1) 4,4-diphenyl-2-cyclohexen-1-one, (2) 3-(dimethyl amino)-5,5-dimethyl-2-cyclohexen-1-one (3) 3-(2-hydroxyethylamino)-5,5-dimethyl-2-cyclohexen-1-one, (4) 4,5-diphenyl-1,3-dioxol-2-one, (5) 2-oxazolidine, (6) 4-ethoxy methylene-2-phenyl-2-oxazolin-5-one, 97, (7) 5-methoxy-1-tetralone, (8) 6-methoxy-1-tetralone, (9) 5-(hydroxy methyl)-2-pyrrolidone, (10) flavone, (11) 4-methoxy chalcone, (12) 4'-methoxy chalcone, (13) 4-(dimethyl amino) chalcone, (14) trans, trans-dibenzylidene acetone, and (15) γ(2-naphthyl)-γ-butyro lactone.

6. An ink composition in accordance with claim 1 wherein said viscosity component possesses a melting point of from about 75 to about 135° C. and is present in an amount of from about 45 to about 0.5 percent by weight is selected from the group consisting of mono ketones selected from the group consisting of (1) 1-(4(1-pyrrolidinyl)-2-butynyl)-2-pyrrolidinone sesquifumarate, (2) 6,7-dimethoxy-2,2-dimethyl-4-chromanone, (3) 2,2-dimethyl-7-ethoxy-6-methoxy-4-chromanone, (4) 5,6-dimethoxy-1-indanone, (5) 3-amino-2-ethyl-4(3H)-quinazolinone, (6) 2,6-diphenyl cyclohexanone, and (7) flavanone.

7. An ink composition in accordance with claim 1 wherein said viscosity component controls or modifies the viscosity of said ink and is a diketone selected from the group consisting of (1)1-(2-hydroxyphenyl)-3-phenyl-1,3-propanedione, (2)1-(2-hydroxy-5-methyl phenyl)-3-phenyl-1,3-propanedione, (3)1-(5-chloro-2-hydroxy-4-methylphenyl)-3-phenyl-1,3-propanedione, (4) tetramethyl-1,3-cyclobutane dione, (5) 4-hydroxy-5-methyl-4-cyclopentene-1,3-dione monohydrate, (6) 2,5-oxazolidine dione, (7) 5,5-dimethyl oxazolidine-2,4-dione, (8) 3,6-dimethyl-1,4-dioxane-2,5-dione, (9) 2,2-dimethyl-1,3-dioxane-4,6-dione, (10) 4,4-dimethyl-1,3-cyclohexane dione, and (11) 5-(dimethylamino methylene)-2,2-dimethyl-1,3-dioxane-4,6-dione.

8. An ink composition in accordance with claim 1 wherein said conductive compound is selected from the group consisting of (1) methyl 1-adamantane sulfonate, (2) octadecyl 4-chlorobenzene sulfonate, (3) tetrabutylammonium trifluoro methane sulfonate, (4) S,S'ethylene-ρ-toluene thiosultonate, and (5) pyridinium 3-nitrobenzene sulfonate.

9. An ink composition in accordance with claim 1 wherein said antioxidant is present in an amount of from about 5 to about 0.5 percent by weight and is selected from the group consisting of (1) 2-amino-4-(ethylsulfonyl)phenol, (2) 4-bromo-3,5-dimethylphenol, (3) 3-(ethylamino)-ρ-cresol, (4) tetrakis(2,4-ditert-butylphenyl)4,4'-biphenyl phosphonite), and (5) pentaerythritol tetrakis (3,5-ditert-butyl4-hydroxy hydrocinnamate.

10. An ink composition in accordance with claim 1 wherein said lightfastness component is a UV absorbing compound present in an amount of from about 5 to about 0.5 percent by weight and is selected from the group consisting of (1) 4'-iodoacetophenone, (2) 4'-hydroxy-3'-nitroacetophenone, (3) 4'-hydroxy-3'-methyl acetophenone, (4) 4'-hydroxy-2'-methyl acetophenone, (5) 3',5'-dimethoxy-4'-hydroxyacetophenone, (6) 2',4'-dihydroxy-3'-propyl acetophenone, (7) 2-hydroxy-4'-(2-hydroxyethoxy)-2-methylpropiophenone, (8) 2-benzyl-2-(dimethyl amino)-4'-morpholinobutyrophenone, and (9) 4-dodecyloxy-2-hydroxy benzophenone.

11. An ink in accordance with claim 1 and which ink provides developed images with crease values of from about 5 to 13, haze values of from about 10 to 15, gloss values of from about 80 to 85, conductivity values of from about 6.5 to about 7.5 log (pico.mho/cm) and which ink possesses an acoustic-loss value of from about 10 to about 80 dB/mm, and a viscosity of from about 5 centipoise to about 10 centipoise at a temperature of from about 125° C. to about 165° C.

12. A printing process which comprises incorporating into an acoustic ink jet printer the ink of claim 1.

13. A printing process which comprises (a) providing an acoustic ink printer with a pool of the ink of claim 1 with a free surface, and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in imagewise pattern onto a substrate.

14. An ink in accordance with claim 1 wherein the colorant is selected in an amount of from about 0.5 to about 15 percent by weight.

15. An ink in accordance with claim 1 wherein the colorant is a pigment, a dye or mixtures thereof.

16. An ink in accordance with claim 1 wherein the colorant is a pigment of cyan, magenta, yellow, black, or mixtures thereof.

17. An ink in accordance with claim 1 wherein said alkyl alkyl ketone is (1) n-octyl-n-propyl ketone, (2) n-octyl-n-butylketone, (3) n-decyl-n-ethyl ketone, (4) n-undecyl-n-propyl ketone, (5) n-dodecyl-n-ethyl ketone, (6) di-n-hexylketone, (7) di-n-heptylketone, (8) di-n-octyl ketone, (9) di-n-nonyl ketone, (10) di-n-decyl ketone, (11)di-n-undecyl ketone, (12) di-n-tridecyl ketone, (13) di-n-heptadecyl ketone, or (14) di-n-octadecyl ketone.

18. An ink in accordance with claim 1 wherein said alkyl alkyl ketone is (1) di-n-decyl ketone, (2) di-n-undecyl ketone, (3) di-n-tridecyl ketone, (4) di-n-heptadecyl ketone, or (5) di-n-octadecyl ketone.

19. An ink composition comprised in accordance with claim 1 wherein said ink vehicle is an aryl aryl ketone.

20. An ink in accordance with claim 1 wherein said alkyl alkyl ketone is (1) di-n-tridecyl ketone, (2) di-n-heptadecyl ketone, or (3) di-n-octadecyl ketone, said alkyl aryl ketone is (1) n-octylphenyl ketone, (2) n-undecylphenyl ketone, or (3) n-pentadecylphenyl ketone and said aryl aryl ketone is (1) distyryl ketone, (2) diphenyl acetone, or (3) 2-naphthyl phenyl ketone.

21. An ink in accordance with claim 1 wherein said m and n are dissimilar or equivalent and wherein each of said m and n are independently a number of from about 1 to about 200.

22. An ink in accordance with claim 1 wherein said m and n are from about 1 to about 100.

23. An ink in accordance with claim 1 wherein said m and n are from about 1 to about 25.

24. An ink composition comprised of (1) an alkyl alkyl ketone, an alkyl aryl ketone, or an arylaryl ketone ink vehicle, (2) a ketone, (3) a conductive compound, (4) an antioxidant compound, (5) a lightfastness component, and (6) a colorant.

25. An ink composition comprised of (1) an alkyl aryl ketone ink vehicle, (2) a ketone viscosity ink modifier, (3) a conductive compound, (4) an antioxidant compound, (5) a lightfastness component, and (6) a colorant.

26. An ink in accordance with claim 24 wherein said alkyl contains form about 1 to about 25 carbon atoms and said aryl contains form about 6 to about 30 carbon atoms.

27. An ink in accordance with claim 24 wherein said alkyl aryl ketone is (1) n-octylphenyl ketone, (2) n-undecylphenyl ketone or (3) n-pentadecylphenyl ketone.

28. An ink in accordance with claim 24 wherein said aryl contains form about 6 to about 30 carbon atoms.

29. An ink in accordance with claim 24 wherein said ketone is (1) distyryl ketone, (2) benzylphenyl ketone, (3) di-n-benzyl ketone, (4) diphenyl acetone, (5) 2-naphthyl phenyl ketone, (6) distyryl ketone, (7) benzylphenyl ketone, (8) di-n-benzyl ketone, (9) diphenyl acetone, or (10) 2-naphthyl phenyl ketone.

* * * * *